US00RE45408E

(19) United States
(12) Reissued Patent
Maguire

(10) Patent Number: US RE45,408 E
(45) **Date of Reissued Patent: *Mar. 10, 2015**

(54) LOW PRESSURE DRYER

(76) Inventor: Stephen B. Maguire, West Chester, PA (US)

( * ) Notice: This patent is subject to a terminal disclaimer.

(21) Appl. No.: 11/474,257

(22) Filed: Jun. 22, 2006

Related U.S. Patent Documents

Reissue of:

(64) Patent No.: 6,154,980
Issued: Dec. 5, 2000
Appl. No.: 09/157,238
Filed: Sep. 18, 1998

U.S. Applications:

(62) Division of application No. 10/309,777, filed on Dec. 4, 2002, which is an application for the reissue of Pat. No. 6,154,980.

(60) Provisional application No. 60/059,579, filed on Sep. 19, 1997.

(51) Int. Cl.
*F26B 7/00* (2006.01)

(52) U.S. Cl.
USPC ..... 34/370; 34/403; 34/559; 34/423; 34/408; 34/92; 34/168

(58) Field of Classification Search
USPC ..... 34/289–295, 326, 327, 361, 402, 403, 34/406, 407, 408, 418, 423, 427, 446, 538, 34/559, 92
See application file for complete search history.

(56) References Cited

U.S. PATENT DOCUMENTS

| | | | |
|---|---|---|---|
| 2,161,190 | A | 6/1939 | Paull |
| 3,111,115 | A | 11/1963 | Best |
| 3,115,276 | A | 12/1963 | Johanningmeier |
| 3,209,898 | A | 10/1965 | Bebbe et al. |
| 3,348,848 | A | 10/1967 | Lucking et al. |

(Continued)

FOREIGN PATENT DOCUMENTS

| | | |
|---|---|---|
| DE | 3541532 A1 | 11/1985 |
| DE | 3923241 | 1/1991 |

(Continued)

OTHER PUBLICATIONS

Sheet of 2 photographs of Mould-Tek gravimetric blender, circa 1993.

(Continued)

*Primary Examiner* — Kenneth Rinehart
(74) *Attorney, Agent, or Firm* — Charles N. Quinn; Fox Rothschild LLP

(57) ABSTRACT

A low pressure dryer for granular or powdery material includes a plurality of hoppers rotatable about a common vertical axis serially among material filling and heating, vacuum drying and material discharge positions; pneumatic piston-cylinder means for rotating the hoppers about said axis among said filling and heating, vacuum drying and discharge positions; means for heating contents of a hopper at said filling and heating positions; means for sealing a hopper at said vacuum and drying positions; means for drawing vacuum within a hopper at said vacuum drying position and means for selectably permitting downward flow of dried granular or powdery material out of a hopper at said discharge position where said hoppers move collectively and unitarily one with another.

2 Claims, 7 Drawing Sheets

(amended)

(56) References Cited

U.S. PATENT DOCUMENTS

| | | | | | |
|---|---|---|---|---|---|
| 3,470,994 | A | | 10/1969 | Schnell et al. | |
| 3,959,636 | A | | 5/1976 | Johnson et al. | |
| 4,026,442 | A | | 5/1977 | Orton | |
| 4,108,334 | A | | 8/1978 | Moller | |
| 4,127,947 | A | * | 12/1978 | Webb et al. | 34/92 |
| 4,148,100 | A | | 4/1979 | Moller | |
| 4,219,136 | A | | 8/1980 | Williams et al. | |
| 4,354,622 | A | | 10/1982 | Wood | |
| 4,402,436 | A | | 9/1983 | Hellgren | |
| 4,413,426 | A | | 11/1983 | Graff | |
| 4,454,943 | A | | 6/1984 | Moller | |
| 4,475,672 | A | | 10/1984 | Whitehead | |
| 4,498,783 | A | | 2/1985 | Rudolph | |
| 4,525,071 | A | | 6/1985 | Horowitz et al. | |
| 4,581,704 | A | | 4/1986 | Mitsukawa | |
| 4,603,489 | A | | 8/1986 | Goldberg | |
| 4,705,083 | A | | 11/1987 | Rossetti | |
| 4,756,348 | A | | 7/1988 | Moller | |
| 4,793,711 | A | | 12/1988 | Ohlson | |
| 4,830,508 | A | | 5/1989 | Higuchi et al. | |
| 4,848,534 | A | | 7/1989 | Sandwall | |
| 4,850,703 | A | | 7/1989 | Hanaoka et al. | |
| 5,110,521 | A | | 5/1992 | Moller | |
| 5,116,547 | A | | 5/1992 | Tsukahara et al. | |
| 5,132,897 | A | | 7/1992 | Allenberg | |
| 5,143,166 | A | | 9/1992 | Hough | |
| 5,148,943 | A | | 9/1992 | Moller | |
| 5,172,489 | A | | 12/1992 | Moller | |
| 5,225,210 | A | | 7/1993 | Shimoda | |
| 5,252,008 | A | | 10/1993 | May, III et al. | |
| 5,261,743 | A | | 11/1993 | Moller | |
| 5,285,930 | A | | 2/1994 | Nielsen | |
| 5,293,697 | A | * | 3/1994 | Kawakami | 34/92 |
| 5,340,949 | A | | 8/1994 | Fujimura et al. | |
| 5,341,961 | A | | 8/1994 | Hausam | |
| 5,423,455 | A | | 6/1995 | Ricciardi et al. | |
| 5,651,401 | A | | 7/1997 | Cados | |
| 5,767,453 | A | | 6/1998 | Wakou et al. | |
| 5,767,455 | A | | 6/1998 | Mosher | |
| 5,780,779 | A | | 7/1998 | Kitamura et al. | |
| 5,843,513 | A | | 12/1998 | Wilke et al. | |

FOREIGN PATENT DOCUMENTS

| | | | | |
|---|---|---|---|---|
| DE | 4300060 | * | 7/1994 | F26B 3/06 |
| DE | 4323295 | | 2/1995 | |
| EP | 0318170 | | 5/1989 | |
| EP | 0507689 | | 10/1992 | |
| EP | 0587085 | | 3/1994 | |
| EP | 0743149 | | 11/1996 | |
| FR | 2109840 | | 5/1972 | |
| FR | 2235775 | | 1/1975 | |
| FR | 2517087 | | 9/1982 | |
| GB | 2081687 | | 2/1982 | |
| JP | 1235604 | | 9/1989 | |
| JP | 6114834 | | 5/1991 | |
| JP | 4201522 | | 7/1992 | |

OTHER PUBLICATIONS

Sheet of 2 photographs of Motan gravimetric blender and feeding system with Maguire Products, Inc. controls, circa 1993.

Sheet of 3 photographs of UNA-DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line-up of Blender Solutions . . . Priced Right!" by HydReclaim, circa 1993.

Advertisement entitled "New From HydReclaim—Now Processors Can Economically Achieve Continuous Gravimetric Blending" by HydReclaim, circa 1993.

Article entitled "Control Loading Systems" from *Plastics Technology,* Oct. 1995, p. 41.

Advertisement "Introducting our 400 VME-II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two-sided flyer entitled "GB 140 Series Compact Auto Weigh Blender" published by Conair mFranklin in the United States, Jun. 1994.

Six page brochure entitled "Graviblend Precise Continuous Weigh Blenders" published by Ktron Vertech, Jun. 1991, United States.

Six page brochure entitled "Piovan Gravimetric Blenders MDW" published by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty-two page catalog entitled "Maguire Color Blending Equipment" published by Maguire Products, Ind., 1993, United States.

Two page brochure entitled "Mould-Tek Bulk Handling Systems" published by Mould-Tek Industries, Inc. in Canada, circa 1993.

Brochure entitled "Plastic Molders and Extruders:"published by Maguire Products, Inc., 1995.

US 3,985,362, 10/1976, Nauta (withdrawn)

* cited by examiner

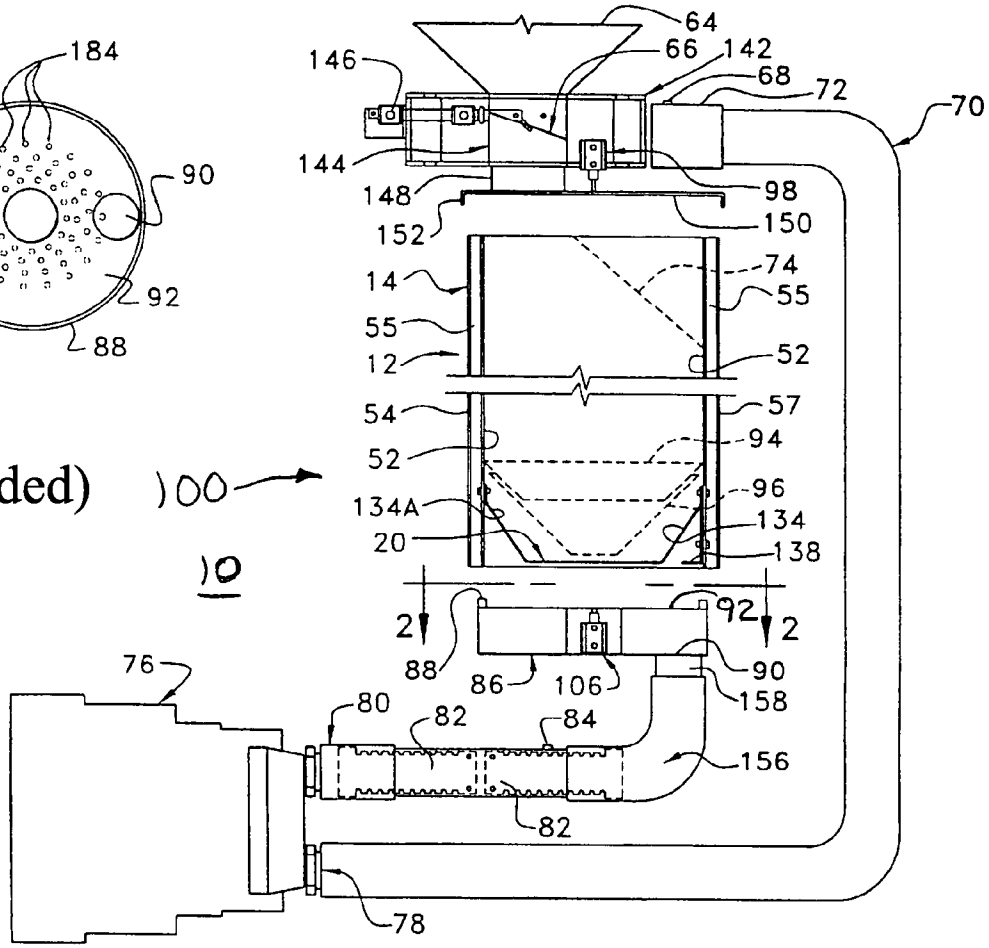
FIG. 1
(amended)
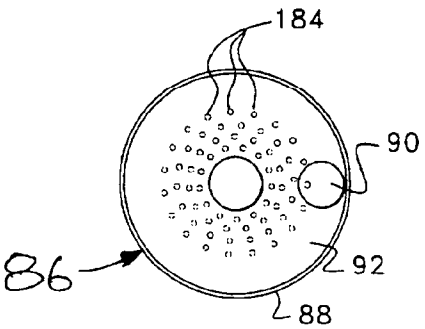
FIG. 2
(amended)

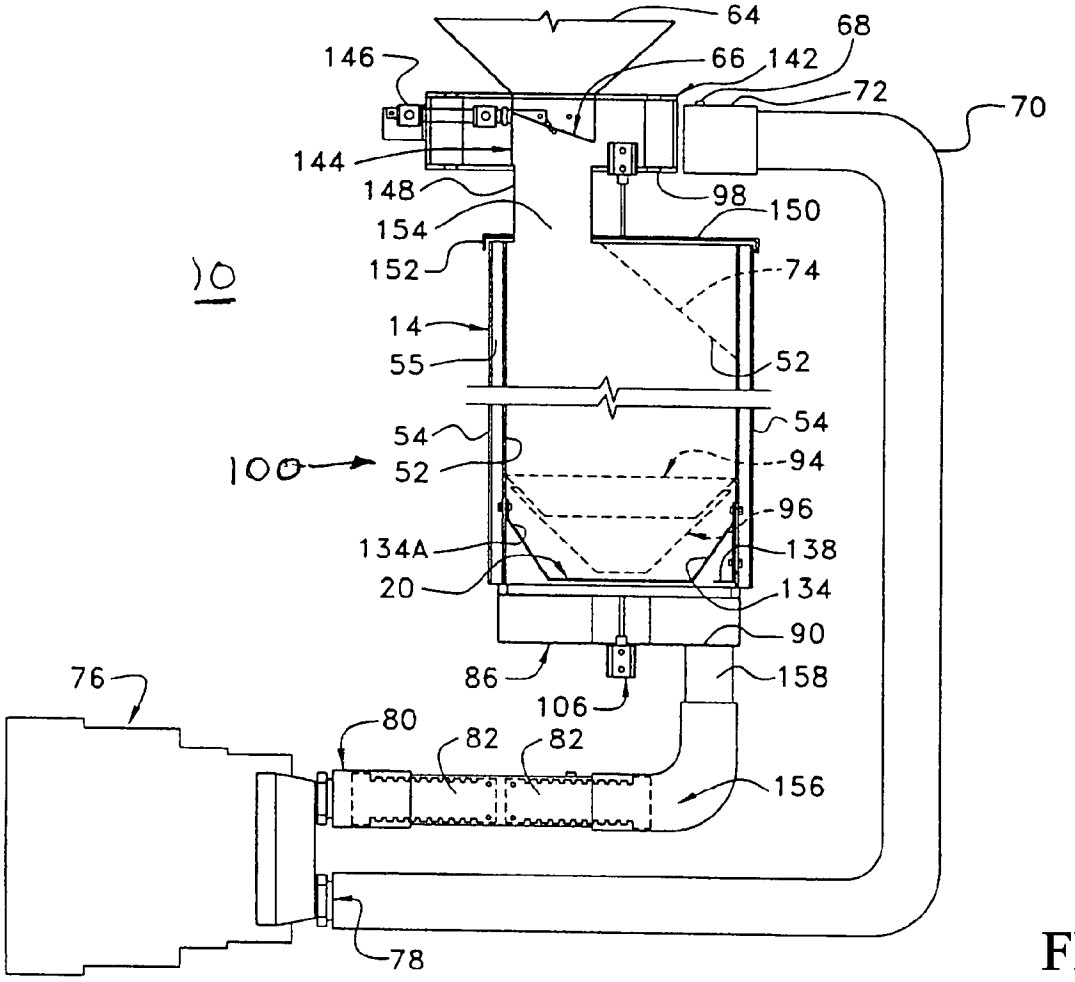
FIG. 3
(amended)

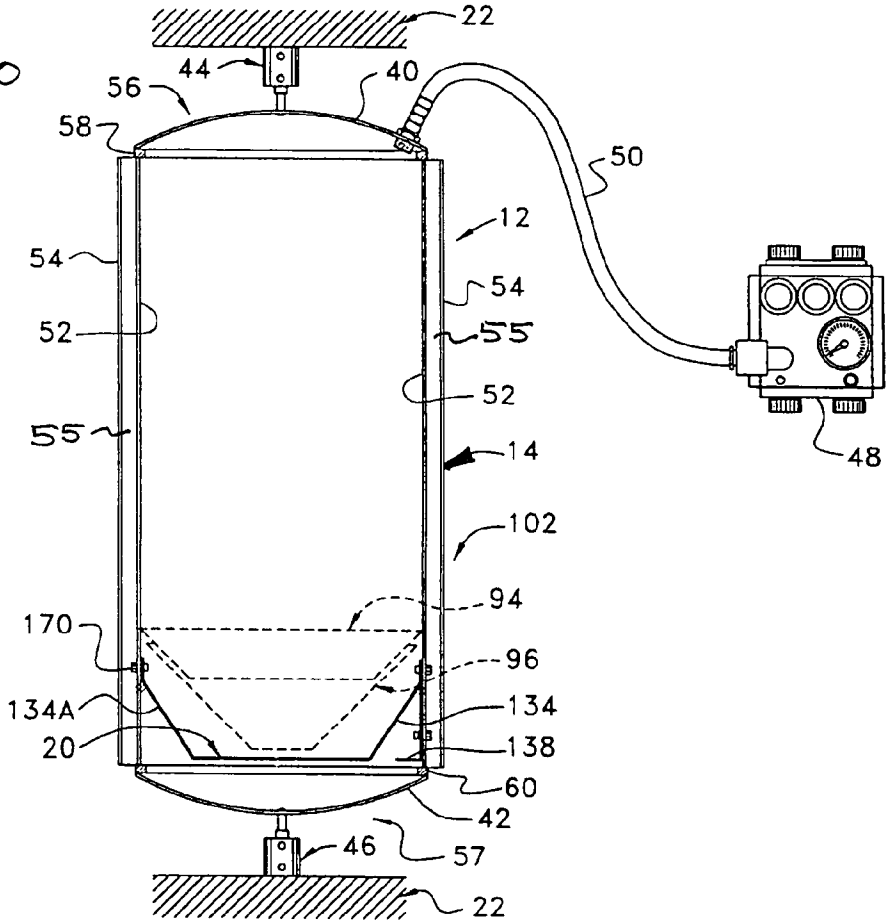
FIG. 5
(amended)
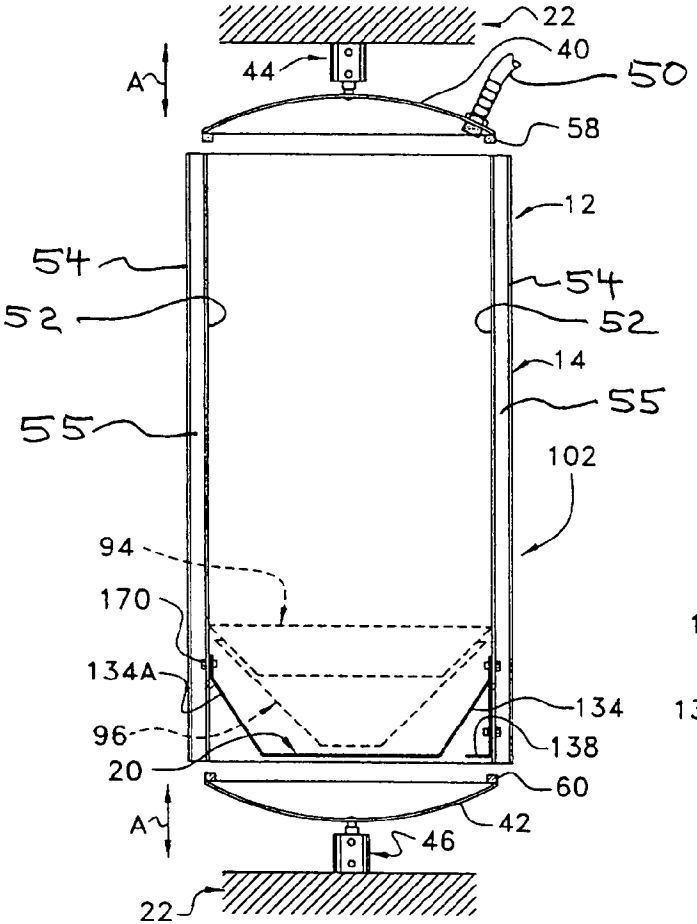
FIG. 4
(amended)

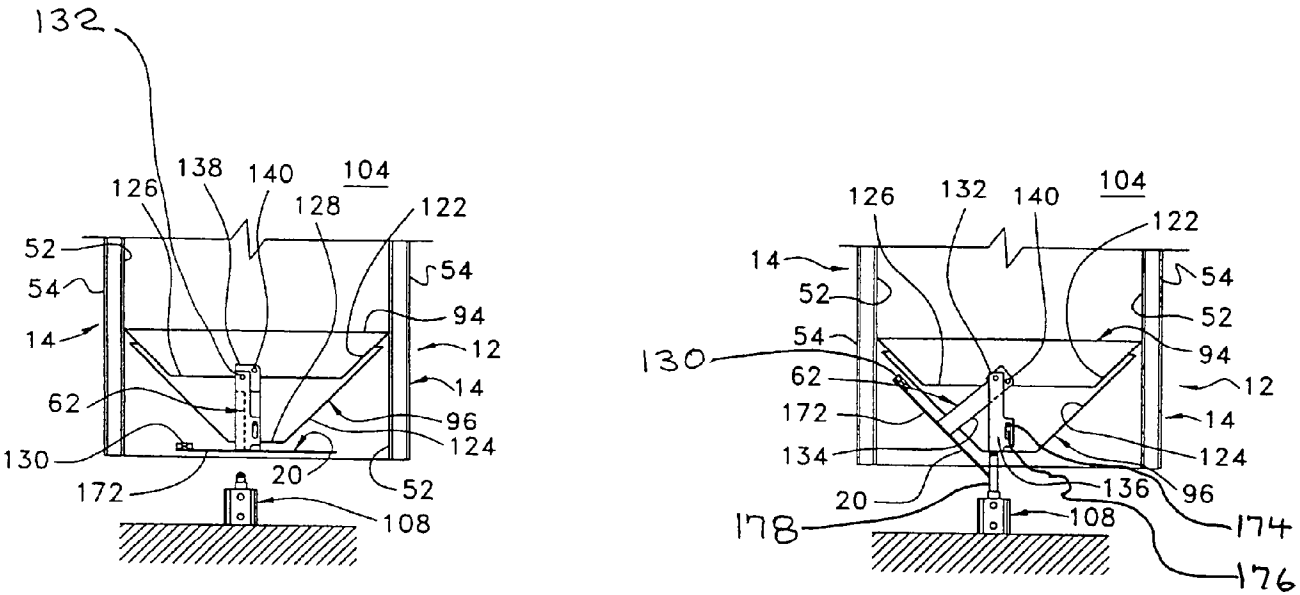
FIG. 7
(amended)
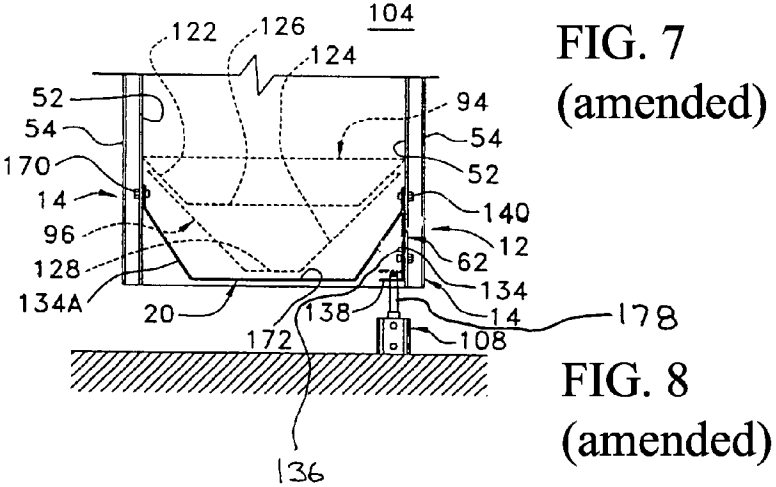
FIG. 8
(amended)
FIG. 6
(amended)

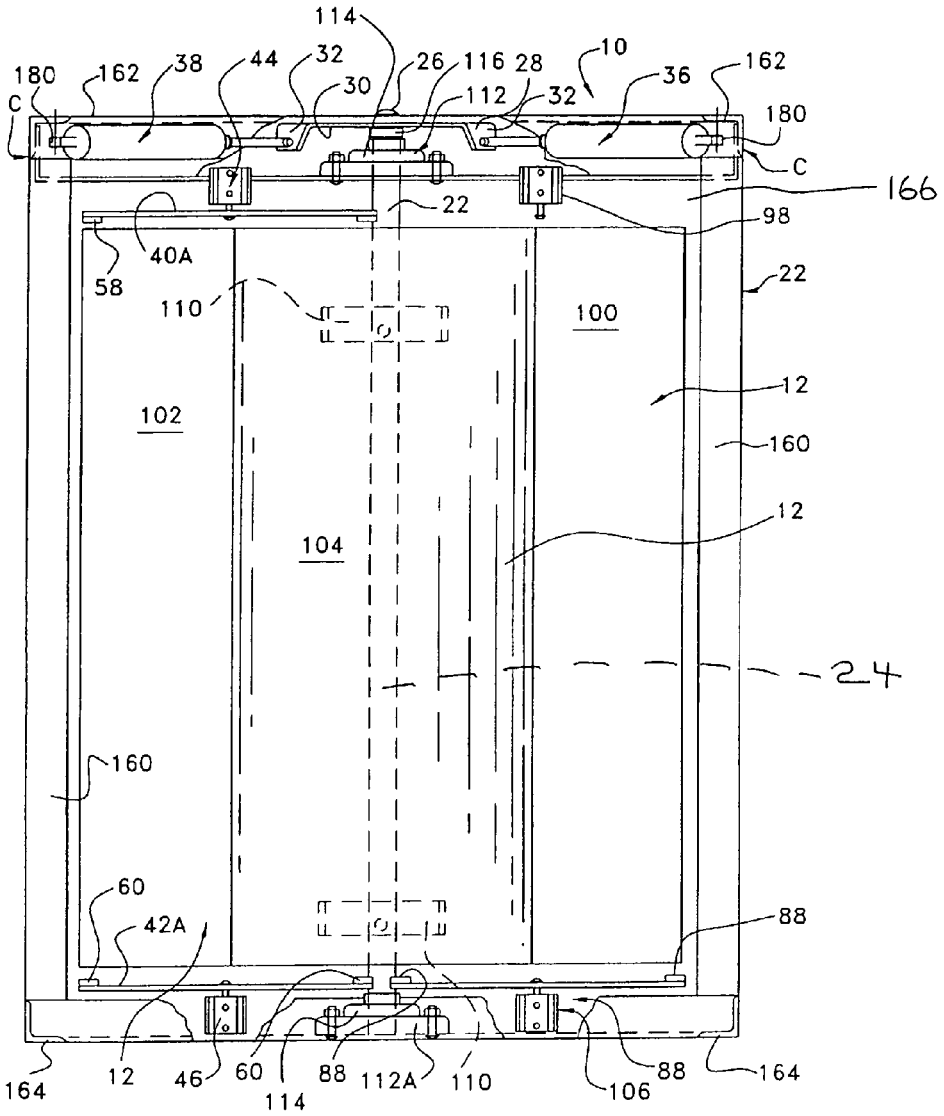
FIG. 10
(amended)

LOW PRESSURE DRYER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS-REFERENCE TO RELATED PATENT APPLICATION]

[This patent application is entitled to the benefit of the filing date of provisional U.S. patent application Ser. No. 60/059,579 filed Sep. 19, 1997 in the name of Stephen B. Maguire entitled "Low Pressure Granular Material Dryer", under 35 USC 120.]

*CROSS-REFERENCE TO RELATED FILINGS*

*This patent application is entitled to the benefit of the filing date of provisional U.S. patent application 60/059,579 filed 19 Sep. 1997 in the name of Stephen B. Maguire entitled "Low Pressure Granular Material Dryer", under 35 USC 119(e). More than one application has been filed for reissue of U.S. Pat. No. 6,154,980, issued 5 Dec. 2000. The reissue applications are application Ser. No. a division of 10/309,777, filed 4 Dec. 2002, and this application Ser. No. 11/474,257 filed 22 Jun. 2006, as a division of application Ser. No. 10/309,777.*

BACKGROUND OF THE INVENTION

1. Field of the Invention

This invention relates to drying granular or powdery material, preferably granular resin material, prior to processing thereof into intermediate or finished products, preferably by extrusion or molding.

2. Description of the Prior Art

Plastic resins are initially granular materials and are produced in pellets. These pellets are processed by extrusion or other means in which the granular resin pellets are heated until the pellets melt and may then be molded or extruded into a desired shape. Typically granular resins melt at elevated temperatures, for example from 300-400° F., which is well above the boiling point of water.

Many granular resins have affinity for moisture. These hydroscopic resins absorb moisture and cannot be properly processed by molding or extrusion until dried. If processed before dry, moisture in the plastic boils at or approaching the high plastic molding or extrusion process temperatures, leaving bubbles and perhaps other imperfections in the finished product. Hence, hydroscopic granular resins must be dried prior to molding or extrusion.

Some granular resin materials are extremely hydroscopic and become unprocessable by molding or extrusion in ten minutes or less after exiting a dryer, due to the rapid absorption of moisture by the granular resin material.

It is known to dry granular resin material by placing the granular resin material pellets on large shallow trays to a depth of one or two inches, and putting those trays into ovens for several hours. With this approach to granular resin material drying, resin temperatures of 150-180° F., but no higher, can be used since many granular resin materials begin to soften at 200-210° F.

During the drying process, the granular resin material cannot be permitted to soften, since it becomes unmanageable.

Once granular resin material begins to soften, at temperatures above the boiling point of water, the granular resin material pellets stick together in lumps or even melt into useless masses of solid plastic, making it impossible to further process the resin material into a useful article.

SUMMARY OF THE INVENTION

In one of its aspects, this invention provides a low pressure granular or powdery granular material dryer. The dryer preferably includes a rotatable preferably vertical shaft, a plurality of preferably vertically-oriented, open-ended preferably cylindrical hoppers which are preferably equiangularly positioned and rotatable about a vertical axis, which is preferably defined by the shaft, serially among material filling and healing, vacuum drying and dispensing positions.

The dryer preferably further includes a pin extending vertically and radially displaced from the axis, a preferably triangular preferably horizontal plate rotatably receiving the pin proximate the center of the plate, a preferably horizontal link pivotally connecting said shaft and the plate, and a plurality of preferably pneumatic piston-cylinder combinations equiangularly operatively connected to the plate for rotating the shaft by sequentially moving the plate relative to the shaft thereby to move the hoppers among the filling and heating, vacuum drying and dispensing positions.

The dryer yet preferably includes preferably pneumatic piston-cylinder actuated means for sealing the cylindrical hoppers at the vacuum drying station.

In another of its aspects, this invention provides a hopper for use in a low pressure granular resin material or powdery material dryer where the hopper includes a preferably vertically-oriented preferably cylindrical shell having open ends with the shell preferably adapted to be sealingly closed by selectably contacting top and bottom plates thereagainst, thereby enabling vacuum to be drawn within the shell when desired. The hopper further preferably includes a funnel within the cylindrical shell and located proximate the shell bottom. The hopper further preferably includes an internal material flow control plate in the form of a dump flap located within the shell beneath the funnel. The dump flap is preferably pivotally connected to the shell for movement about the connection point away from a downwardly opening discharge orifice of the funnel, thereby to selectably release granular resin material from the hopper.

In yet a further aspect of the invention, top and bottom plates preferably selectably seal the cylindrical shell thereby allowing vacuum to be drawn therewithin. Pneumatic piston-cylinder means may be provided for urging the top and bottom plates into sealing contact with the shell.

The shell is desirably adapted to selectably dispense granular or powdery material stored therewithin at a dispense position, when the shell is at that position. The dispense position is preferably removed from the vacuum drying position.

The hopper is further preferably adapted to effectuate material dispensing upon contact by an upwardly moving rod of a pneumatic piston-cylinder combination, thereby permitting downward flow from the funnel of material with the material thereby flowing out of the cylindrical shell.

In yet another of its aspects, this invention provides a method for continuously drying granular or powdery material preparatory to mixing, molding, extruding or other processing of that material. The method preferably includes supplying granular or powdery material to a vertically-oriented cylindrical shell at a fill and heat position and heating the material within the shell by introduction of heated air into the cylindrical shell while at the fill and heat position.

The method yet further preferably includes moving the vertically-oriented cylindrical shell through an arc about a vertical axis outboard of the shell periphery to a vacuum drying position and sealing open ends of the shell at such position.

The method still yet further preferably includes drawing a preselected level of vacuum within the sealed shell for a time sufficient to evaporate moisture from the heated material within the shell to a desired degree of dryness.

The method even yet further preferably includes bringing the shell to a material discharge position at which the bottom of the shell is open and then discharging the dried material from the cylindrical shell responsively to action of a preferably pneumatic piston-cylinder combination inserting a rod into the shell interior from below to move a material discharge gate proximate the bottom of the shell.

The method preferably still yet even further includes moving the shell through an arc about the vertical axis to the fill and heat position and sequentially repeating the steps of supplying material to the shell, heating the material within the shell, moving the shell to the vacuum drawing position, drawing a sufficient level of vacuum within the shell to evaporate moisture from the material within the shell and moving the shell to a discharge position, for so long as the material is to be continuously dried.

In yet another of its aspects, this invention provides a method for continuously supplying dried granular resin material for processing from a supply of material which is excessively moist where the method preferably includes substantially simultaneously performing the steps of heating a portion of the moist granular resin material to a selected temperature at which the moisture evaporates from the granular resin material at a preselected level of vacuum, drawing and maintaining the preselected vacuum for a second portion of the granular resin material which has been heated to the selected temperature for time sufficient to cause the moisture to evaporate therefrom and result in the second portion of granular resin material being at the preselected dryness and supplying to granular resin material processing equipment a third portion of the granular resin material which was dried to the preselected dryness by evaporation in the preselected level of vacuum after having been heated to the selected temperature.

BRIEF DESCRIPTION OF THE DRAWINGS

FIG. 1 is a front elevation of part of the low pressure granular or powdery material dryer showing a cylindrical hopper portion of the dryer at a material filling and heating position prior to supply of heated air to the hopper interior, in accordance with the preferred embodiment of the invention.

FIG. 2 is a plan view of the supply plenum portion of the low pressure dryer at the heating and filling station, taken at arrows 2-2 in FIG. 1.

FIG. 3 is a front elevation of part of the low pressure dryer showing a hopper portion of the dryer at the material filling and heating position, as illustrated generally in FIG. 1, configured for supply of heated air to the hopper.

FIG. 4 is a partially sectioned, schematic elevation of a vertically-oriented open ended cylindrical hopper, forming a part of the low pressure dryer, showing the hopper at a vacuum drying position with the hopper open so that pressure within the hopper is ambient.

FIG. 5 is a partially sectioned, schematic elevation of the vertically-oriented open ended generally cylindrical hopper illustrated in FIG. 4, with top and bottom plates sealing the hopper, thereby allowing vacuum to be drawn within the hopper and further illustrating the hopper connected to a vacuum pump.

FIG. 6 is a broken front schematic elevation of the lower interior of a vertically-oriented open ended generally cylindrical hopper as illustrated generally in FIGS. 4 and 5, showing two material discharge funnels within the hopper, with the hopper illustrated at the material dispensing position.

FIG. 7 is a broken front schematic elevation of the lower interior of a vertically-oriented open ended generally cylindrical hopper as illustrated in FIG. 6, at the same material dispensing position illustrated in FIG. 6, illustrating the material dispensing piston-cylinder combination actuated, thereby actuating a discharge flap beneath the discharge funnels within the hopper permitting material flow out of the hopper.

FIG. 8 is a broken schematic side elevation of the lower interior of a vertically-oriented open ended generally cylindrical hopper as shown in FIGS. 6 and 7, taken looking from the right in FIG. 7 illustrating the material dispensing piston-cylinder combination actuated, thereby moving a discharge flap beneath the material discharge funnels depicted in dotted lines within the hopper, to dispense material from the hopper.

FIG. 10 is a front elevation the low pressure dryer illustrated in FIGS. 1 through 9.

DESCRIPTION OF THE PREFERRED EMBODIMENT AND BEST MODE KNOWN FOR PRACTICING THE INVENTION

Figure 9:
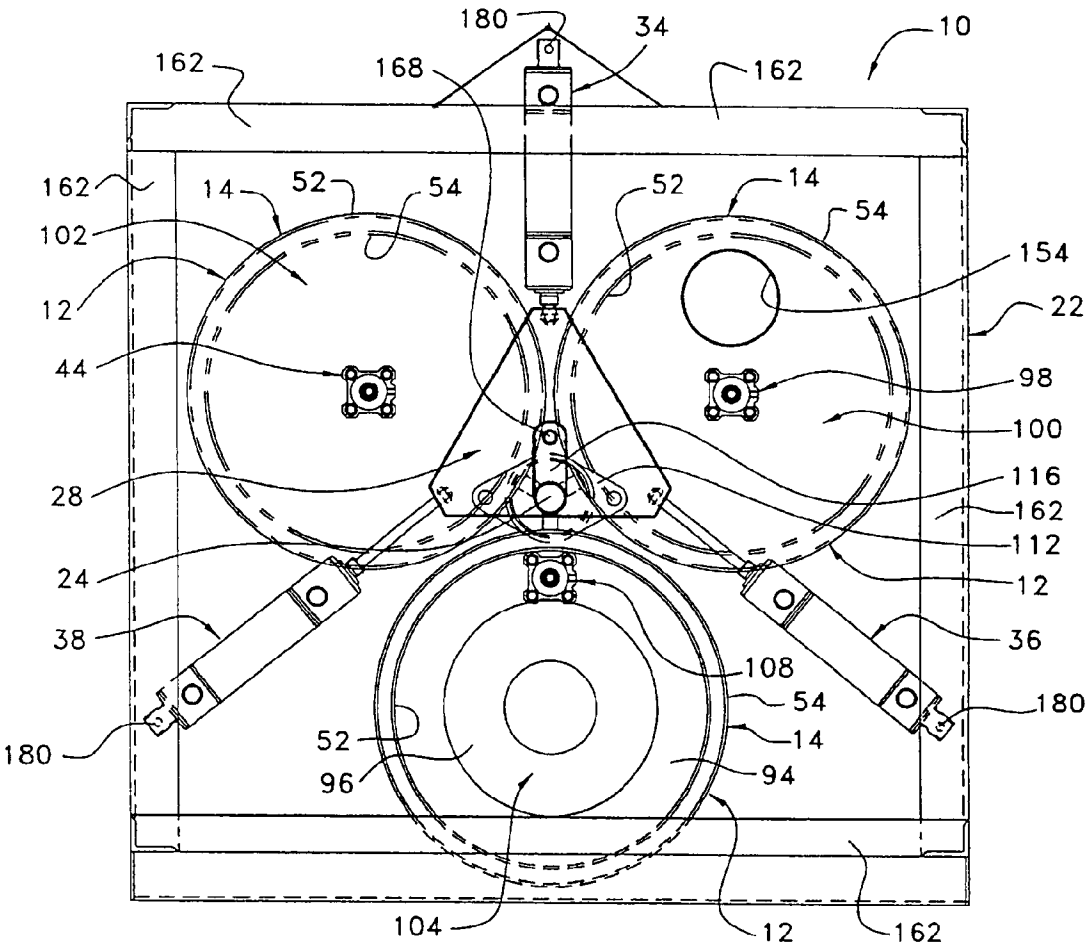
FIG. 9 is a top view of low pressure dryer illustrated in FIGS. 1 through 8.
Figure 11:
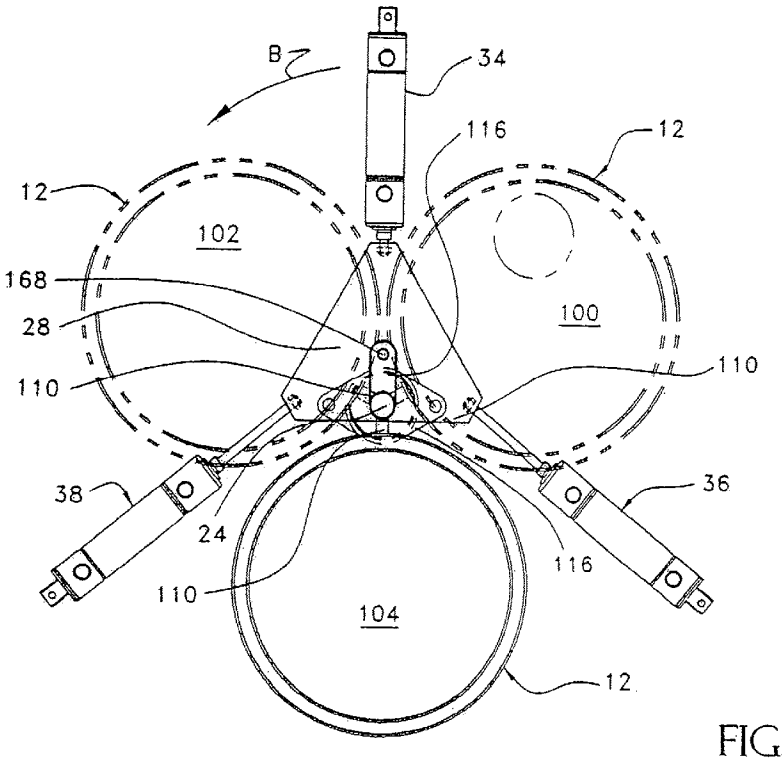
FIG. 11 is a top view, similar to FIG. 9, schematically illustrating a portion of the low pressure dryer.

Referring to the drawings in general and to FIGS. 9, 10 and 11 in particular, a low pressure granular material dryer manifesting aspects of the invention is designated generally 10 and includes a plurality of cylindrical hoppers, preferably three, each of which has been designated generally 12. Each hopper 12 preferably includes a cylindrical shell 14 and is preferably substantially vertically-oriented with the axis of the cylinder extending substantially vertically in order to be rotatable preferably unitarily with the other hoppers about a substantially vertical axis defined by a preferably vertical shaft 24.

Dryer 10 includes a frame, designated generally 22, on and within which vertical shaft 24 is rotatably mounted for rotation relative to frame 22, the details of which are discussed below. Cylindrical hoppers 12 rotating unitarily with vertical shaft 24 preferably move serially among a material fill and heat position designated generally 100, a material vacuum drying position designated generally 102 and a material dispensing position designated generally 104. Hoppers 12 move when and as required among fill and heat position 100, vacuum drying position 102 and dispensing position 104. The three hoppers 12 start and stop together as required; they do not move continuously in a merry-go-round fashion among positions 100, 102 and 104.

Referring principally to FIGS. 9 and 10, frame 22 is formed of a plurality of vertically and horizontally extending preferably angle iron members which collectively define what appears as the edges of a rectangular parallelepiped. As visible in FIG. 10, frame 22 includes preferably four substantially vertical members 160, only two of which are visible in FIG. 10; the remaining two substantially vertical members 160 are hidden behind the two members 160 visible in FIG. 10.

Frame 22 further includes four upper substantially horizontally extending members 162 which collectively define the outer periphery of a square in geometrical terms; the four upper substantially horizontally extending members 162 are visible in FIG. 9; not all of members 162 are visible in FIG. 10.

Frame 22 further yet preferably includes four lower horizontally extending members 164, one of which is visible in FIG. 10. The remaining lower members 164 lie immediately under the corresponding upper horizontally extending members 162 illustrated in FIG. 9. The four lower horizontally extending members 164 define the base of frame 22 for contacting a floor or other weight supporting structure on which dryer 10 rests.

At least one and preferably a plurality of suspension members 166 extend laterally across the upper end of dryer 10, between selected upper horizontal members 162. One of such suspension members 166 is illustrated in FIG. 10. A hopper top sealing piston-cylinder combination designated generally 44, serving to seal the top of a hopper 12 at the vacuum drying position, is supported by one of horizontally extending suspension members 166 as illustrated in FIG. 10. Similarly, a hopper upper closure piston-cylinder combination 98 located at material fill and heat position 100, which piston-cylinder combination is used to close an upper end of a cylindrical hopper 12 at the fill and heat position 100, is supported by one of horizontally extending suspension members 166 as also illustrated in FIG. 10.

First, second and third driving rotation piston-cylinder combinations 34, 36, 38 are preferably pivotally connected to selected ones of upper horizontal members 162 of frame 22 as illustrated in FIG. 10. In the case of first driving rotation piston-cylinder combination 34, a triangular or cantilever extension may be provided from the proximate upper horizontal member 162 where the triangular extension has been designated generally 182 in FIG. 9. Connections of driving rotation piston-cylinder combinations 34, 36 and 38 to frame 22 are denoted as pivotal connections 180 in the drawings.

Connection of generally triangular plate 28 with vertically-oriented shaft 24 is effectuated by means of a pin connector 168 which is vertically-oriented and resides rotatably slidably within an aperture formed at the center of horizontal central portion 30 of generally triangular plate 28. Pin connector 168 fits rotatably not only within triangular plate 28 but also fits rotatably within an aperture in one end of a plate-pin connection arm 116 best shown in FIG. 9. While plate-pin connection arm preferably lies under triangular plate 28 as is apparent from FIG. 10, plate-pin connection arm 116 has been illustrated in solid lines in FIG. 9 to facilitate understanding.

Plate-pin connection arm 116 is fixedly connected to vertical shaft 24 at the upper end thereof.

In this arrangement movement of triangular plate 28, as effectuated by any of first, second or third driving rotation piston-cylinder combinations 34, 36 or 38, results in pin connector 168 translating such motion to plate-pin connection arm 116. Rotation of plate-pin connection arm 116, being fixedly connected to shaft 24, results in shaft 24 rotating. As shaft 24 rotates, it carries hoppers 16 among the fill and heat position 100, vacuum drying position 102 and material dispense position 104. Hoppers 16 move this way unitarily with shaft 24 as a result of hoppers 16 being fixedly connected to shaft 24 by cantilever connecting rods 110, illustrated in phantom lines in FIG. 10.

Shaft 24 is journaled in suitable bearings mounted on upper and lower shaft suspension plates 112 to define upper and lower shaft bearing assemblies 114 as indicated in FIG. 10. Upper shaft suspension plate 112 is connected to a horizontally extending suspension member 166 by suitable nut and bolt combinations which have not been numbered but are clearly visible in FIG. 10; lower shaft suspension plate 112 is connected to a lower horizontal member 164 as indicated generally in FIG. 10, again by suitable nut and bolt combinations which have not been numbered in the drawings.

Referring to FIGS. 1 through 3 illustrating the fill and heat position 100 of lower pressure dryer 10, at fill and heat position 100 a moist material supply hopper 64 has a supply of moist granular or powdery material, which is to be dried resident therein. A butterfly valve at the bottom of hopper 64 is within a conduit 144 and is operated by a piston-cylinder combination 146 as clearly visible in FIGS. 1 and 3.

Conduit 144 includes a telescoping portion 148 for connecting moist material supply hopper 64 with a hopper top sealing plate 150 at fill and heat position 100. Positioned around the outer periphery of hopper top sealing plate 150 is an annular lip 152. An aperture 154 is within hopper top sealing plate 150 and facilitates communication between telescoping portion 148 of conduit 144 and the interior of a hopper 14 when at the fill and heat position.

Still referring to FIGS. 1 and 3, a hopper 14 is illustrated in position as a result of having been rotated to that position by rotation of vertical shaft 24 in response to first, second and third driving rotation piston-cylinder combinations 34, 36 and 38.

At material fill and heating position 100, a blower 76 facilitates recirculation of heated air through material 74 resident within hopper 14 to heat material 74. Blower 76 has an intake aperture 78 and an exhaust aperture 80. Exhaust aperture 80 connects to conduit 156 within which there are a plurality of heater elements 82 to heat air exhausted from blower 76 prior to flow through material within hopper 12. Conduit 156 includes a telescoping portion 158 connecting with and exhausting into a supply plenum designated generally 86 via a plenum inlet 90 which is visible in both FIGS. 1 and 2.

Plenum 86 includes an outlet screen 88 mounted at the upper end thereof, as illustrated generally in FIG. 2. Outlet screen 92 has a plurality of apertures 184 formed therein with apertures 184 concentrated towards the central portion of outlet screen 92 as illustrated in FIG. 2. Apertures 184 serve to concentrate upward flow of the heating air about the central portion or central axis of hopper 14 which is desirable since this is where the majority of the material is concentrated to the shape of dispensing funnels 94, 96. A preferably silicon annular gasket 88 on plenum 86 provides tight sealing between supply plenum 86 and the open bottom of hopper 12 at the material fill and heat position illustrated in FIGS. 1 and 3.

A pneumatic piston-cylinder combination 106 is mounted on a suitable cross-member, not illustrated in the drawings but forming a part of frame 22. When actuated, piston-cylinder combination 106 serves to close the bottom of hopper 12 in the fill and heat position by moving supply plenum 86 vertically upwardly, from the position illustrated in FIG. 1 to the position illustrated in FIG. 3, thereby effectuating a tight seal between outlet plenum 86 and hopper 12 to facilitate passage of heated air through granular or powdery material in hopper 14.

Heated air, having passed through granular or powdery material within hopper 14, exhausts from hopper 14 via telescoping portion 148 of conduit 144. A butterfly valve 66 having closed conduit 144 so that heated air passing through telescoping portion 148 of conduit 144 cannot escape through supply hopper 64, causes the heated, moist air to flow into heated air recirculator 70 at heated recirculation intake 72. A thermocouple 68 positioned at heated air recirculation intake 72 senses temperature of heated air leaving hopper 14. A second thermocouple 84 is positioned proximate the outlet of the heated air supplied by blower 76, after the heated air has passed along heating elements 82. When the temperature sensed by thermocouples 68 and 84 are substantially equal, this is indicative of the granular or powdery material within hopper 14 having reached the desired temperature, namely the selected temperature of the air entering into supply plenum 86 after having been heated by heating elements 82.

During material heating at the fill and heat position, hopper top sealing plate 150 is lowered into position against the upper extremity of hopper 14 by action of a pneumatic piston-cylinder combination 98 which is connected to a suitable cross-member extending across the top of frame 22.

Referring to FIGS. 4 through 8 in particular, each preferably cylindrical hopper 12 preferably includes a cylindrical shell designated generally 14. Each cylindrical shell 14 is preferably defined by an inner cylindrical tube referred to as a vacuum tube and designated 52 in the drawings and a concentric outer cylindrical tube referred to as an insulation tube and designated 54 in the drawings. Annular space between tubes 52 and 54, which space is designated generally 55 in the drawings, is preferably filled with thermal insulation to minimize heat transfer and heat loss out of cylindrical shell 14.

A pair of downwardly opening material dispensing funnels designated 94 and 96 respectively are secured within each cylindrical shell 14 of cylindrical hopper 12 proximate the bottom of hopper 12. The higher of the two material dispensing funnels is referred to as an upper material dispensing funnel and is designated 94 in the drawings. The lower of the two material dispensing funnels is referred to as the lower material dispensing funnel and is designated generally 96 in the drawings. Material dispensing funnels 94 and 96 are preferably fixedly secured, by suitable sheet metal screws or other fastening means, to a lower portion of vacuum tube 52 at the positions generally indicated in the drawings.

Material dispensing funnels 94 and 96 preferably share a common funnel angle such that the sloped sides of the respective funnels are essentially parallel one with another. The sloped surface or side of upper material dispensing funnel is designated generally 122 in the drawings while the sloped side of lower dispensing funnel 96 is designated generally 124 in the drawings.

As further apparent from the drawings, particularly FIGS. 6 through 8, upper dispensing funnel 94 is configured as an extremely truncated cone such that the downwardly dispensing opening of upper material dispensing funnel 94, which is designated 126 in the drawings, is substantially larger than a corresponding downwardly dispensing opening 128 of lower material dispensing funnel 96. This results from lower dispensing funnel 96 being less truncated in the vertical direction than upper dispensing funnel 94, as is illustrated in the drawings.

Use of two dispensing funnels such as dispensing funnels 94, 96 facilitates circulation of heated drying air around material in hopper 14 at filling and heating position 100 and further facilitates drying of the material in hopper 14 when the hopper is at vacuum drying position 102.

Each hopper 14 preferably further includes a dump flap designated generally 20 located below downwardly dispensing opening 128 of lower funnel 96. Dump flap 20 is pivotally connected to vacuum tube 52 by suitable screw connections which are illustrated in the drawings, particularly in FIGS. 4, 5 and 8, and are numbered 140 and 170 respectively.

Dump flap 20 includes a central portion 172 which is generally planar in configuration as illustrated in the drawings, particularly FIGS. 6, 7 and 8, and has a weight 130 located at one side thereof, offset from the point of pivotal connection between dump flap 20 and dump actuator 62, which point of pivotal connection is denoted 132 in the drawings, and also offset from the pivotal connection of dump flap 20 with vacuum tube 52 of hopper shell 14 as effectuated by screw-nut connection 170 and offset from pivotal connection 140 of pivoting arm 134 to the interior surface of vacuum tube 52. Weight 130 helps to cause dump flap 20 to return to the position illustrated in FIG. 6 in response to gravitational force after material dispensing piston-cylinder combination 108 has been deactuated.

Dump actuator 62 engages a generally vertical air 134 forming a part of dump flap 20. Dump actuator 62 includes a vertically movable arm 136, also illustrated in FIG. 7. Vertically movable arm 136 is mounted for sliding, vertical movement along the interior surface of vacuum tube 52 of horizontal shell 14. The extent of vertical movement of vertically movable arm 136 is controlled by a pin 174 illustrated in FIG. 7, which is preferably mounted fixedly to and extending radially inwardly from the interior of vacuum tube 52. A vertical slot 176, similarly visible in FIG. 7, in vertically movable arm 136 receives pin 174. Interference between pin 174 and the ends of slot 176 limits vertical travel of movable arm 136.

Movement of arm 136 upwardly in FIGS. 6, 7 and 8 results from actuation of material dispensing piston-cylinder combination 108, which is preferably a pneumatically powered piston-cylinder combination. When piston-cylinder combination 108 is actuated, a piston rod 178 extending from piston-cylinder combination 108 contacts a horizontal tabular extension portion of vertically movable arm 136. This horizontal tabular extension of vertically movable arm 136 is designated 138 and is shown in FIG. 8. There tabular extension 138 is illustrated in solid lines in the "at rest" or unactuated position and in dotted lines in the position assumed by tabular extension 138, and hence vertically movable arm 136, when material dispensing pneumatic piston-cylinder combination 108 has been actuated and the piston rod associated therewith extends therefrom.

Actuation of material dispensing piston-cylinder combination 108 moves vertically movable arm 136 upwardly, to the position illustrated in solid lines in FIG. 8; the movement of arm 136 is from the position illustrated in FIG. 6 to the position illustrated in FIG. 7.

Vertically movable arm 136 is pivotally connected to an arm 134 portion of dump flap 20.

Arm 134 connects the horizontal part of dump flap 20 to the inside of vacuum tube 52 via a pivotal connection identified as 140 in FIGS. 6, 7 and 8. Arm 134 is pivotally connected not only to the interior vacuum tube 52 at connection 140 but is also pivotally connected to vertically movable arm 136 at a pivotal connection 132. As a result, upward movement of vertically movable arm 136 causes pivotal movement of pivoting arm 134 about pivotal connection 140. Since pivotal connections 140 and 170 are horizontally aligned along a common axis, pivotal movement of arm 134 about this axis moves the horizontal part of dump flap 20 away from the dispensing aperture of lower funnel 96 thereby permitting granular or powdery material contained within hopper 12 to float downwardly outwardly therefrom when dump flap 20 is in the position illustrated in FIG. 7.

Once preferably pneumatic hopper dispensing piston-cylinder combination 108 has been deactuated, gravitational force acting with weight 130 tends to rotate dump flap 20 back to the horizontal, hopper closed, position illustrated in FIGS. 6 and 8. This causes vertically movable arm 136 to drop downwardly, from the position illustrated in FIG. 7 to the position illustrated in FIG. 6. This further causes arm 134 to rotate counterclockwise from the position illustrated in FIG. 7 to the position illustrated in FIG. 6, about pivotal connection point 140. This returns dump flap 20 to the horizontal position illustrated in FIG. 6 where granular material in hopper 12 cannot flow outwardly downwardly therefrom through the open bottom of hopper 12.

The horizontal portion 172 of dump flap 20 is positioned sufficiently close to and sufficiently overlaps downwardly dispensing opening 128 of lower funnel 96 about the periphery of dispensing opening 128 that the angle of repose of any granular or powdery material within hopper 12 is sufficient to prevent downward flow of material through the gap between horizontal portion 172 of dump flap 20 and dispensing opening 128 of lower funnel 96.

Material dispensing piston-cylinder combination 108 is preferably mounted either on a portion of frame 22 below dryer 10 or on some other stable member such as the floor of an installation where dryer 10 may be used. In either case, material dispensing piston-cylinder combination 108 is stationary in the sense that piston-cylinder combination 108 does not rotate with hoppers 12 as they are moved among fill and heat position 100, vacuum drying position 102 and material dispense position 104; hopper dispensing piston-cylinder combination 108 remains at material dispense position 104.

As apparent from FIG. 8, dump flap 20 includes two arms 134, 134A. Arm 134A which is located at the side of dump flap 20 remote from material dispensing piston-cylinder combination 108 is pivotally connected directly to vacuum tube 52, preferably by screw-nut combination 170 as illustrated in FIGS. 4 and 5, for pivotal movement as dump flap 20 is actuated.

In FIGS. 4 and 5 one of hoppers 12 is illustrated at vacuum drying position 102. FIG. 4 illustrates hopper 12 at vacuum drying position 102 prior to movement of hopper top and bottom vacuum sealing plates 40, 42 into position to seal cylindrical shell 14 so that a vacuum may be drawn therewithin.

Hopper top and bottom vacuum sealing plates 40, 42 are preferably respectively connected to unnumbered piston rod extensions which are connected to and are parts of hopper top and bottom sealing piston-cylinder combinations 44, 46 respectively. Piston-cylinder combinations 44, 46 are preferably pneumatically actuated; the cylinder portions thereof are preferably fixedly connected to horizontally extending cross-members of frame 22 as indicated generally in FIGS. 4 and 5.

Hopper top and bottom vacuum sealing plates 40, 42 are most preferably of dome-like shape, as illustrated in FIG. 4, and have upper and lower vacuum sealing gaskets 58, 60 positioned running circumferentially around the unnumbered preferably circular lips of preferably dome-like hopper top and bottom vacuum sealing plates 40, 42 respectively.

When a hopper 12 is located at vacuum drying position as illustrated in FIG. 4, pneumatic actuation of respective hopper top and bottom sealing piston-cylinder combinations 44, 46 respectively causes respective dome-like hopper top and bottom vacuum sealing plates 40, 42 to move vertically towards cylindrical hopper shell 14. Arrows A in FIG. 4 denote the vertical movement of hopper top and bottom vacuum sealing plates 40, 42 respectively.

When hopper cylindrical shell 14 is located at vacuum drying position 102, actuation of respective piston-cylinder combinations 44, 46 moves top and bottom sealing plates 40, 42 downwardly and upwardly respectively to effectuate an airtight, vacuum maintaining seal between the preferably circular periphery of top and bottom sealing plates 40, 42, where vacuum gaskets 58 and 60 are preferably located and the preferably circular circumferential top and bottom edges of vacuum tube 52. The hopper top and bottom vacuum sealing plates 40, 42 in this position, with gaskets 58, 60 in sealing connection with the circumferential circular top and bottom edges of vacuum tube 52, as illustrated in FIG. 5.

Top vacuum sealing plate 40 preferably includes a fitting, not numbered in the drawings, selectably connectingly receiving a preferably flexible vacuum line 50 which is preferably connected to a vacuum pump depicted schematically in FIG. 5 and designated 48. When hopper top and bottom vacuum sealing plates 40, 42 have been engaged with cylindrical shell 14 as illustrated in FIG. 5 and vacuum pump 48 is actuated, vacuum is drawn within hopper 12 at this vacuum drying position. As pressure drops within hopper 12 at this vacuum drying position, moisture rapidly evaporates from granular resin material within hopper 12.

Once moisture has been evaporated from resin material within hopper 12 when located at vacuum drying position 102 and the resin material has reached a desired degree of dryness, hopper top and bottom sealing piston-cylinder combinations 44, 46 are permitted to return to their default positions illustrated in FIG. 4. This retracts hopper top and bottom vacuum sealing plates 40, 42 away from and out of contact with cylindrical shell 14, thereby permitting air once again to enter cylindrical shell 14 and permitting cylindrical shell 14, having the now-dried granular resin material therewithin, to be moved to the material dispensing position.

The time during which vacuum is drawn within hopper 12 while located at vacuum drying position 102 may be adjusted by microprocessor control means connected to and associated with the low pressure granular material dryer. Similarly, the level of vacuum drawn in hopper 12 at vacuum drying position 102 may be adjusted. Furthermore, air withdrawn from hopper 12 by vacuum pump 48 may be monitored for moisture content and vacuum pump 48 may be halted once the desired low level of moisture of the material within hopper 12 has been attained. The microprocessor control means controls operation of the low pressure dryer, including operation of the pneumatic piston-cylinder combinations, the blower, the vacuum pump, etc.

Referring to FIGS. 9, 10 and 11, plate-pin connection arm 116 is rotatably connected to a generally horizontal plate 28 by pin connector 168. Pin connector facilitates rotation of plate 28 respecting plate-pin connection arm 116 and hence respecting pin-like extension 26 and vertical shaft 24.

Plate 28 includes a horizontal central portion 30 and downwardly projecting lips 32 extending from the periphery of plate 28.

Three preferably pneumatically actuated piston-cylinder combinations 34, 36 and 38 are designated respectively first, second and third piston-cylinder combinations and are pivotally connected to frame 22, specifically to upper horizontally extending member 162 of frame 22, as generally illustrated respecting second and third piston-cylinder combinations 36, 38 in FIG. 9. The pivotal connections are designated 180 in FIG. 9.

To facilitate rotation of plate 28 about an axis defined by vertical shall 24, first, second and third piston-cylinder combinations 34, 36, 38 are actuated as needed. Each piston-cylinder combination 34, 36, 38 has a piston rod extension which fits loosely within a respective aperture formed in a respective portion of a downwardly projecting lip 32, with the piston rods being retained in position within those apertures by nuts threaded on the piston rod extremities as illustrated generally in FIGS. 9 and 11.

With this arrangement, as piston-cylinder combinations 34, 36, 38 are actuated to move their associated piston rods, from extended positions in which the piston rods of piston-cylinder combinations 36, 38 are illustrated in FIG. 11 to the retracted position in which the piston rod extension of piston-cylinder combination 34 is illustrated in FIG. 11. As a result plate 28 and hence, vertical shaft 24 and cylindrical hoppers 12 attached thereto rotate about the axis of vertical shaft 24, thereby moving hoppers 12 serially among the material fill and heat, vacuum drying and material dispense positions 100, 102, 104 respectively as illustrated in FIGS. 9 and 11.

For example, referring to FIG. 9, upon actuation of first driving rotation piston-cylinder combination 34 to extend the piston shaft therefrom forwardly out of the retracted position illustrated in FIG. 9 and actuation of third driving rotation piston-cylinder combination 38 to cause the piston shaft associated therewith to retract to within piston-cylinder combination 38, plate 28 rotates counterclockwise as considering FIG. 9, in the direction indicated by arrow A, with such rotation of plate 28 being about pin connector 168 and as illustrated in FIG. 11 and indicated by arrow B.

As plate 28 rotates about pin connector 168 in the direction indicated by arrow A, plate 28 together with pin connector 168 rotate with horizontally extending plate-pin connection arm 116 pivotally about the axis defined by vertical shaft 24 thereby rotating shaft 24. This rotation results from plate-pin connection arm 116 being fixedly connected to shaft 24. Hence, as first, second and third driving rotation piston-cylinder combinations 34, 36 and 38 respectively are actuated in a sequential manner, plate 28 rotates about pin connector 168 and plate 28, pin connector 168 and plate-pin connection arm 116 all rotate about the vertical axis defined by shaft 24 thereby to rotate shaft 24.

The vertically-oriented cylindrical sides of hopper shells 14 defined by vacuum tubes 52 and insulation tubes 54 are connected to shaft 24 for rotation therewith by cantilever connecting rods 110 as best Illustrated in FIG. 10. Each cylindrical shell 14 of a cylindrical hopper 12 may be removable from its associated cantilever connecting rods 110 if desired; preferably two cantilever connecting rods 110 are provided for each hopper 12, with one rod 110 connecting hopper 12 to vertical shaft 24 at positions relatively close to but removed from the vertical extremities of hoppers 12, as illustrated in FIG. 10.

FIG. 9 has been drawn without depiction of moist material supply hopper 64, exhaust plenum 142 and the structure associated therewith, to enhance drawing clarity. Similarly, hopper dispensing piston-cylinder 108 has been depicted in FIG. 9 even though it is to be understood that such piston-cylinder combination would not be visible in the view from above dryer 10 since when a hopper 12 is at material dispense position 104, piston-cylinder combination 108 is blocked from view from above.

Arrow B in FIG. 11 depicts the preferred direction of rotation of vertical shaft 24 and hoppers 12 so as to move hoppers 12 serially from the material fill and heat position 100 to material vacuum drying position 102, then to material dispense position 104 and then to material fill and heat position 100, where this cycle may repeat.

At the material vacuum drying position, the heated material is preferably subjected to a vacuum of about 27.5 millimeters of mercury or greater. This lowers the evaporation point or boiling point of water to only 120° F., thereby causing the moisture within the heated material to evaporate and be drawn off through the vacuum pump drawing vacuum within hopper 12 at the vacuum drying position 102. Once the vacuum drying process is sufficiently complete, piston-cylinder combinations 44, 46 retract hopper top and bottom sealing plates 40, 42 so that hopper 12 may move from the vacuum drying position to the material dispense position.

Blower 70 is preferably a one horsepower blower. Preferably two heater elements 82 are utilized, as illustrated in the drawings. Air flow through supply plenum 86 is preferably restricted to 4.5 ounces of pressure.

As depicted schematically in the drawings by line 74 indicating the angle of repose of within hopper 12, an air space is permitted to remain within hopper 12 to accommodate material spillage during movement of hoppers 12 and cycling of the drying process.

The material fill and heat and vacuum drying functions may each take approximately twenty minutes. Accordingly, in one hour, all three hoppers 12 preferably cycle through material fill and heat position 100, material vacuum drying position 102 and material dispense position 104. If each hopper 12 is approximately 10 inches in diameter and 24 inches high, each hopper 12 will hold about one cubic foot of granular resin material, which is about thirty-five pounds of granular resin material. With such configuration, dryer 10 embodying the invention can provide about 100 pounds per hour of dried granular resin material for subsequent processing by plastic injection molding or extrusion equipment.

As is apparent from the drawings, hoppers 12 are preferably provided equally spaced around vertical shaft 24 with hoppers 12 120° apart.

What is claimed is

[1. A low pressure dryer for granular or powdery material, comprising:

a. a plurality of hoppers rotatable about a common vertical axis serially among material filling and heating, vacuum drying and material discharge positions;

b. a plurality of pneumatic piston-cylinder combinations for rotating said hoppers about said axis among said filling and heating, vacuum drying and discharge positions;

c. means for heating contents of a hopper at said filling and heating position;

d. means for sealing a hopper at said vacuum drying position;

e. means for drawing vacuum within a hopper at said vacuum drying position; and f. means for selectably permitting downward flow of dried granular or powdery material out of a hopper at said discharge position.]

[2. Dryer of claim 1 further comprising:

a. a vertical shaft defining said vertical axis;

b. said pneumatic piston-cylinder combinations being equiangularly positioned about said shaft for rotating said shaft and thereby said hoppers.]

[3. Dryer of claim 1 wherein said hoppers are open-ended, generally vertically oriented cylindrical configuration and equiangularly positional respecting a vertical axis.]

[4. A hopper for use in a low pressure granular or powdery material dryer comprising:

a. a vertically-oriented cylindrical shell having open ends, adapted to be sealingly closed by selectably contacting top and bottom plates thereagainst, enabling vacuum to be drawn within said shell when said shell is at a vacuum drawing position;

b. a funnel within said cylindrical shell proximate the bottom thereof;

c. an internal material flow control plate located within said cylindrical shell beneath said funnel, pivotally connected to said cylindrical shell for movement about said connection away from a downwardly opening discharge orifice in said funnel to a position permitting downward granular resin material flow from said hopper. ]

[5. Hopper of claim 4 further comprising:

a. top and bottom plates for selectively sealing said cylindrical shell allowing vacuum to be drawn therein;

b. pneumatic piston-cylinder means for urging said top and bottom plates into sealing contact with said shell; said shell being adapted to selectively dispense granular material stored therein at a dispense position removed from said vacuum drawing position.]

[6. A method for continuously drying granular or powdery material preparatory to mixing, molding, extruding or other processing of that material, comprising the steps of:

a. supplying granular or powdery material to a vertically-oriented cylindrical shell at a fill and heat position and heating said material within said shell by introduction of heated air into said cylinder;

b. moving said vertically-oriented cylindrical shell through an arc about a vertical axis outboard of the shell periphery to a vacuum drying position and sealing open ends of said shell thereat;

c. drawing a preselected level of vacuum within said sealed shell for time sufficient to evaporate moisture from said heated material to a desired degree of dryness;

d. moving said shell to a discharge position at which said shell is open;

e. discharging said dried material from said cylindrical shell responsively to a pneumatic piston-cylinder combination actuating a material discharge gate proximate the bottom of said shell; and f. moving said shell through an arc about said vertical axis to a fill and heat position and sequentially repeating steps (a) through (d) for so long as said granular plastic material is to be continuously dried.]

[7. A method for continuously supplying dried granular resin material for processing from a supply of material which is excessively moist, comprising substantially simultaneously performing the steps of:

a. heating a portion said moist material to a selected temperature at which said moisture evaporates therefrom at a preselected level of vacuum;

b. drawing and maintaining said preselected level of vacuum for a second portion of said material which has been heated to said selected temperature for a time sufficient to cause said moisture to evaporate therefrom and result in said second portion of material being at a preselected dryness; and c. supplying to granular resin material processing equipment a third portion of said material which has been dried to said preselected dryness by evaporation in said preselected level of vacuum after being heated to said selected temperature.]

[8. The method of claim 7 wherein said portions are serially supplied.]

[9. A method for continuously drying granular or powdery material in batches preparatory to mixing molding, extruding or other processing of that material, comprising the steps of:

a. supplying granular or powdery material to a closeable shell at a fill position;

b. heating said material within said shell by introduction of heated air thereinto;

c. moving said shell to a vacuum drying position and sealing said shell thereat;

d. drawing a preselected level of vacuum within said sealed shell for time sufficient to evaporate moisture from said heated material to a desired degree of dryness;

e. moving said shell to a discharge position at which said shell is opened.

f. discharging said dried material from said shell; and g. moving said shell to said fill position and sequentially repeating steps (a) through (f) for so long as said granular plastic material is to be continuously dried.]

[10. The method of claim 9 wherein said heating further comprises introducing air into said shell at a desired material temperature, measuring temperature of said air as it exists said shell, comparing said exit air temperature to said desired temperature and halting heating when said exit air reaches said desired temperature.]

[11. The method of claim 9 wherein said heating further comprises capturing heating air leaving said shell for recycling through said shell.]

[12. The method of claim 10 wherein said heating further comprises capturing heating air leaving said shell for recycling through said shell.]

[13. A low pressure dryer for granular or powdery material, comprising:

a. a shell movable among material filling and heating, vacuum drying and material discharge positions;

b. means for moving said shell serially among said filling and heating, vacuum drying and discharge positions;

c. means for heating contents of said shell at said filling and heating position;

d. means for drawing vacuum within a said shell at said vacuum drying position; and e. means for selectably permitting downward flow of dried granular or powdery material out of a shell at said discharge position.]

[14. The dryer of claim 13 further comprising:

a. means for sealing said shell at said vacuum drying position.]

[15. A low pressure dryer for granular or powdery material, comprising:

a. a plurality of shells movable among material filling and heating, vacuum drying and material discharge positions;

b. means for moving said shells serially simultaneously among said filling and heating, vacuum drying and discharge positions;

c. means for heating contents of a shell at said filling and heating position;

d. means for drawing vacuum within a shell at said vacuum drying position; and e. means for selectably permitting downward flow of dried granular or powdery material out of a shell at said discharge position.]

[16. The dryer of claim 15 further comprising:

a. means for sealing a shell at said vacuum drying position.]

[17. The dryer of claim 15 wherein said shells are collectively movable among material filling, drying and discharge positions.]

[18. A low pressure dryer for granular or powdery material, comprising:

a. a plurality of shells collectably movable serially among material filling, drying and discharge positions;

b. means for moving said shells among said filling, drying and discharge positions;

c. means for heating shell contents prior to arrival at said drying position;

d. means for sealing said shells at said drying position;

e. means for drawing vacuum within said shells at said drying position; and f. means for emptying dried granular or powdery material from said shells at said discharge position.]

[19. A low pressure dryer for granular or powdery material, comprising:

a. a plurality of shells serially movable around a circuit along which said shells are filled emptied, heated and vacuum dried;

b. means for moving said shells around said circuit for filling and emptying said shells and heating and vacuum drying of material in said shells;

c. means for heating said shells prior to drying;

d. means for sealing said shells for drying;

e. means for drawing vacuum within said shells during drying; and f. means for emptying dried granular or powdery material from said shells after drying.]

*20. A method for continuously serially supplying portions of dried granular plastic resin material for processing, by molding or extrusion into intermediate or finished products, from a supply of material which is excessively moist, comprising:*

*simultaneously performing the steps of:*

*a. heating a portion said moist material in a first closeable container to a selected temperature at which said moisture evaporates therefrom at a preselected level of vacuum by:*

*i. heating air to the desired material temperature;*

*ii. blowing the heated air through the material in the shell;*

*iii measuring the temperature of the air as it exits the shell;*

*iv. comparing the exit air temperature to the desired material temperature;*

*v. capturing the heated air as it exits the shell and recycling the air through the shell after heating step "i"; and*

*vi. halting heating and blowing the air when the exit air temperature equals the desired material temperature;*

*b. drawing and maintaining said preselected level of vacuum for a second portion of said material in a second closeable container, which is identical to said first container and has been closed, immediately after the material has been heated to said selected temperature while in said second container, without any intermediate vacuum being drawn, for a time sufficient to cause said moisture to evaporate therefrom and result in said second portion of material being at a preselected dryness; and*

*c. supplying to granular resin material processing equipment for molding or extrusion into an intermediate or final product a third portion of said material from a third closable container identical to said first and second containers, which material has been dried while within said third closeable container to said preselected dryness by evaporation of moisture from said material under said preselected level of vacuum while in said third closeable container after being heated to said selected temperature while in said third closeable container, the supplying being effectuated by opening a bottom of said third closeable container and permitting material in said third closeable container to flow downwardly out of said third closeable container.*

*21. A low pressure dryer for granular plastic resin material, comprising:*

*a. a shell movable serially about a circuit sequentially to material filling and heating, vacuum drying and material discharge positions, the shell having an opening for discharge of granular plastic resin from the bottom of the shell, that is sealingly closeable to permit vacuum of at least 27 inches of mercury to be drawn within said shell upon selectably movable contacting sealing means moving thereagainst, enabling vacuum to be drawn within said shell when said shell is at a vacuum drawing position, the shell further comprising:*

*i. a downwardly tapering funnel, the upper extremity of the funnel contacting the shell interior, for collecting and channeling downwardly flowing granular plastic resin material towards said opening, said funnel being positioned within said shell proximate the bottom thereof;*

*ii. a dump flap located within said shell beneath said funnel, pivotally connected to the shell interior for movement about said connection away from a position blocking downward flow of granular plastic resin material towards a downwardly opening discharge aperture in said shell, to a position remote from a downwardly opening discharge opening in the funnel thereby permitting downward granular resin material flow through the funnel and the opening in the shell, out of said hopper;*

*b. means for moving said shell serially about the circuit among said filling and heating, vacuum drying and discharge positions;*

*c. means for heating contents of said shell at said filling and heating position of the circuit;*

*d. means for drawing vacuum within a said shell at said vacuum drying position; and*

*e. means for selectably permitting downward flow of dried granular or powdery material out of a shell while in the circuit at said discharge position.*

* * * * *